(12) United States Patent
Gurvich et al.

(10) Patent No.: US 11,649,849 B2
(45) Date of Patent: May 16, 2023

(54) BUCKLING-RESISTANT THIN-WALL DRIVE SHAFTS

(71) Applicants: Hamilton Sundstrand Corporation, Charlotte, NC (US); Raytheon Technologies Corporation, Farmington, CT (US)

(72) Inventors: Mark R. Gurvich, Middletown, CT (US); Georgios S. Zafiris, Glastonbury, CT (US); Brayton Reed, New York Mills, NY (US); Joyel M. Schaefer, Earlville, NY (US); Michael King, Sauquoit, NY (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 295 days.

(21) Appl. No.: 17/156,332

(22) Filed: Jan. 22, 2021

(65) Prior Publication Data
US 2022/0235814 A1    Jul. 28, 2022

(51) Int. Cl.
*F16C 3/02* (2006.01)
*B23K 31/02* (2006.01)
(Continued)

(52) U.S. Cl.
CPC ............ *F16C 3/023* (2013.01); *B23K 31/027* (2013.01); *B29C 66/52272* (2013.01);
(Continued)

(58) Field of Classification Search
CPC ....... B23K 31/027; B29C 65/02; B29C 65/48; B29C 65/562; B29C 65/564;
(Continued)

(56) References Cited

U.S. PATENT DOCUMENTS 2,751,765 A    6/1956  Rowland et al.
4,909,361 A    3/1990  Stark et al.
(Continued)

FOREIGN PATENT DOCUMENTS

| WO | WO2006019478 A1 | 2/2006 |
| WO | 2007100593 A2 | 9/2007 |
| WO | 2007100593 A3 | 9/2007 |

OTHER PUBLICATIONS

Extended European Search Report dated May 31, 2022, received for corresponding European Application No. 22151796.4, pp. 9.

*Primary Examiner* — Philip C Tucker
*Assistant Examiner* — Brian R Slawski
(74) *Attorney, Agent, or Firm* — Kinney & Lange, P.A.

(57) ABSTRACT

A mechanical part configured to be placed under torque. The mechanical part includes an inner tube having, a corrugated web, and an outer shell. The inner tube has an outer tube circumference, a tube axial direction, and a tube length. The corrugated web has a plurality of peaks and a plurality of troughs, a height measured as a difference between one of the peaks and one of the troughs, and a web length perpendicular to the height and in the tube axial direction. The outer shell has an inner shell circumference, an outer shell circumference, and a shell length. The plurality of troughs is affixed to the outer circumference of the inner tube. The plurality of peaks is affixed to the inner shell circumference of the outer shell. The web length is aligned with the tube length and the shell length.

18 Claims, 10 Drawing Sheets

(51) Int. Cl.
  *B29C 65/00* (2006.01)
  *B29C 65/02* (2006.01)
  *B29C 65/48* (2006.01)
  *B29C 65/60* (2006.01)

(52) U.S. Cl.
  CPC .............. *F16C 3/026* (2013.01); *B29C 65/02* (2013.01); *B29C 65/48* (2013.01); *B29C 65/601* (2013.01); *B29C 66/721* (2013.01); *F16C 2204/00* (2013.01); *F16C 2204/20* (2013.01); *F16C 2204/42* (2013.01); *F16C 2204/60* (2013.01); *F16C 2208/02* (2013.01); *F16C 2208/04* (2013.01); *F16C 2208/20* (2013.01); *F16C 2208/82* (2013.01); *F16C 2226/36* (2013.01); *F16C 2326/06* (2013.01); *F16C 2326/43* (2013.01)

(58) Field of Classification Search
  CPC . B29C 65/601; B29C 65/72; B29C 66/52272; B29C 66/721; B29C 66/301; F16C 2204/00; F16C 2204/20; F16C 2204/42; F16C 2204/60; F16C 2208/02; F16C 2208/04; F16C 2208/20; F16C 2208/80; F16C 2208/82; F16C 2226/36; F16C 2226/40; F16C 2326/06; F16C 2326/43; F16C 3/023; F16C 3/026; F16C 33/425; B32B 1/08
  USPC ............. 156/60, 91, 92, 196, 197, 210, 218, 156/244.13, 292, 293, 294, 296, 297, 156/307.1, 308.2, 309.6; 464/179, 180, 464/181, 183; 29/455.1; 428/36.9, 36.91
  See application file for complete search history.

(56) References Cited

U.S. PATENT DOCUMENTS

| | | | |
|---|---|---|---|
| 5,924,531 A * | 7/1999 | Stark | F16C 3/023 188/372 |
| RE39,521 E | 3/2007 | Herrington | |
| 8,104,392 B2 | 1/2012 | Milwich et al. | |
| 2001/0001769 A1 | 5/2001 | Kimoto et al. | |
| 2004/0048022 A1 | 3/2004 | Pratt | |
| 2006/0178060 A1* | 8/2006 | Wada | F16C 3/026 440/83 |
| 2009/0048031 A1 | 2/2009 | Conger et al. | |

\* cited by examiner

BUCKLING-RESISTANT THIN-WALL DRIVE SHAFTS

BACKGROUND

Fiber-reinforced polymer-matrix composite drive shafts provide an important opportunity for significant weight reduction due to their relative high strength (per weight or volume) in comparison, for example, with similar metallic drive shafts. As a consequence of such material efficiency of composites, corresponding designs of composite shafts with relatively thin walls seems to be capable of satisfying strength criteria. However, this advantage can create, at the same time, a potential major disadvantage, since it can increase risks of buckling due to the very thin walls of a drive shaft.

To minimize these risks, the thickness of composite drive shaft walls is usually over-designed by adding "parasitic" layers specifically to avoid buckling, but without any benefits to drive shaft strength at load levels below the buckling point. It makes drive shafts much heavier and more expensive and significantly reduces opportunities for their layup optimization. The risk of buckling can be noted especially for drive shafts under torque (i.e., under the most dominant load component), which means that many such drive shafts are made with over-designed thick walls.

SUMMARY

A mechanical part configured to be placed under torque. The mechanical part includes an inner tube having, a corrugated web, and an outer shell. The inner tube has an outer tube circumference, a tube axial direction, and a tube length. The corrugated web has a plurality of peaks and a plurality of troughs, a height measured as a difference between one of the peaks and one of the troughs, and a web length perpendicular to the height and in the tube axial direction. The outer shell has an inner shell circumference, an outer shell circumference, and a shell length. The plurality of troughs is affixed to the outer circumference of the inner tube. The plurality of peaks is affixed to the inner shell circumference of the outer shell. The web length is aligned with the tube length and the shell length.

A method for making such a mechanical part includes: providing the inner tube, the corrugated web, and the outer shell; affixing the corrugated web to the outer circumference of the inner tube; and affixing the inner circumference of the outer shell to the plurality of the peaks of the corrugated web to form a combined tube-web-shell system.

DETAILED DESCRIPTION

The weight of an aircraft has a large impact on the performance and cost of flight operation; therefore, it is desirable to decrease the weight without sacrificing its structural integrity or safety. Drive shafts, and other parts that are put under torque can have their weight reduced, as described herein. In the following description drive shafts in aircraft are described, but the designs described can also be used for any part that is placed under torque over the course of normal usage, including, for example pipes, actuators, components of landing gears and many other load-bearing structures with cylindrical shape. The use of fiber-reinforced polymer-matrix composite materials allows for lightening the drive shaft. However, the resulting drive shafts are also relatively thin, due to high material strength efficiency, and more prone, therefore, to buckling when placed under torque. In the past, to prevent buckling, the thickness of the drive shaft is increased using parasitic layers. These layers prevent buckling, but also significantly increase the weight of the drive shaft without providing any additional performance advantages.

It has been discovered that the bending stiffness in the hoop direction is a dominant factor in controlling buckling. Therefore, it is desirable to increase the hoop stiffness without significantly increasing the weight of the drive shaft. As described herein, this can be accomplished by providing truss-type reinforcement along the length of the drive shaft. The resulting drive shaft is less prone to buckling under dominant torsional load and is significantly lighter than past designs.

Figure 1A:
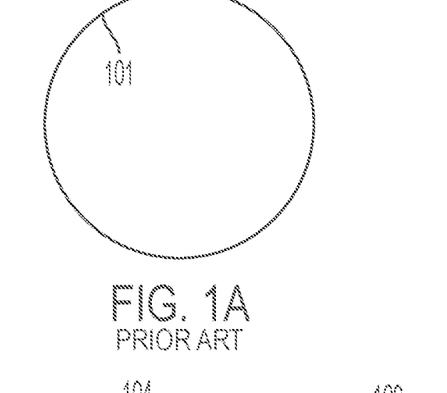
FIG. 1A is a diametric cross-sectional view of a prior art drive shaft based on conventional design.

FIG. 1A is a cross-sectional view of a prior art drive shaft 101. Drive shaft 101 is a tube of metal or composite material. The hoop stiffness depends on the thickness of drive shaft 101, with a thicker drive shaft being less prone to buckling.

Figure 1B:
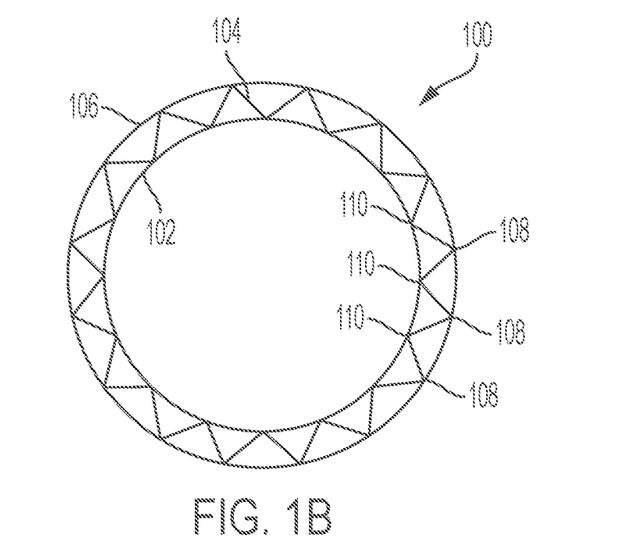
FIG. 1B is a diametric cross-sectional view of a representative drive shaft with proposed design embodiment.

FIG. 1B is a cross-sectional view of drive shaft 100 as described herein. FIG. 1B shows shaft body 102, corrugated web 104, outer shell 106, peaks 108, and troughs 110. Shaft body 102 is affixed to corrugated web 104 at troughs 110. Corrugated web 104 is also affixed to outer shell 106 at peaks 108. The distance between shaft body 102 and outer shell 106 can be, for example, 5-10% of radius of the shaft body 102. Other embodiments can be based, for example, on 3-5% of radius of the shaft body 102. Additional embodiments can be designed with more aggressive sizes, such as, for example, 10-25% of radius of the shaft body 102. Larger differences between the radius of shaft body 102 and outer shell 106 are useful for situations where a large increase in hoop stiffness is required. Smaller differences are appropriate where only minor increases in hoop stiffness are necessary. Shaft body 102, corrugated web 104, and outer shell 106 can be made of any suitable material, including, for example, metallic (e.g., aluminum, titanium, steel), metal alloy, thermoplastic, or thermoset composite. Here, composite materials are considered as fiber-reinforced polymer-matrix materials with the polymer matrix being either a thermoplastic or a thermoset. Reinforced fiber can be any of those typically applied in composites efficient fibers, such as, for example, carbon, glass or organic fibers or any of their combinations. Different typically applied reinforcement implementations, such as, for example, laminated layups based on a sequence of uni-directionally reinforced individual plies can be used. Other reinforcement implementations can include fiber woven fabrics or multi-dimensionally (e.g., 3D) fiber arrangement. Shaft body 102, outer shell 106, or a combination thereof can be composed of one or more layers of material. Corrugated web 104 can be any suitable shape including, for example, periodic segments with triangular, trapezoidal, or curved with sinusoidal-type geometry. Corrugated web 104 and outer shell 106 extend along the length of shaft body 102. Corrugated web 104 and outer shell 106 can extend the entire length of shaft body 102 or only part of the length, for example, at least 90% of the length, at least 80% of the length, or at least 70% of the length.

Figure 1C:
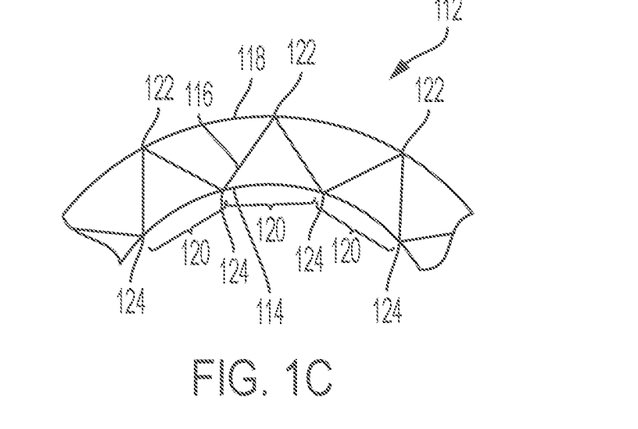
FIG. 1C is a schematic representation of web periodic elements with triangular shape.

FIG. 1C is a schematic representation of web periodic elements with triangular shape. FIG. 1C shows drive shaft 112, shaft body 114, corrugated web 116, outer shell 118, periodic elements 120, peaks 122, and troughs 124. Corrugated web 116 is made up of periodic elements 120 which are triangular in shape. The width in the hoop direction of the periodic elements 120 is measured from one trough 124 to adjacent trough 124.

Figure 1D:
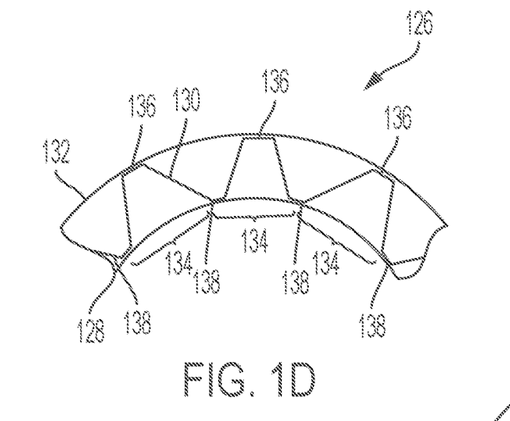
FIG. 1D is a schematic representation of web periodic elements with trapezoidal shape.

FIG. 1D is a schematic representation of web periodic elements with trapezoidal shape. FIG. 1D shows drive shaft 126, shaft body 128, corrugated web 130, outer shell 132, periodic elements 134, peaks 136, and troughs 138. Corrugated web 130 is made up of periodic elements 134 which are trapezoidal in shape. The width in the hoop direction of the periodic elements 134 is measured from one trough 138 to adjacent trough 138.

Figure 1E:
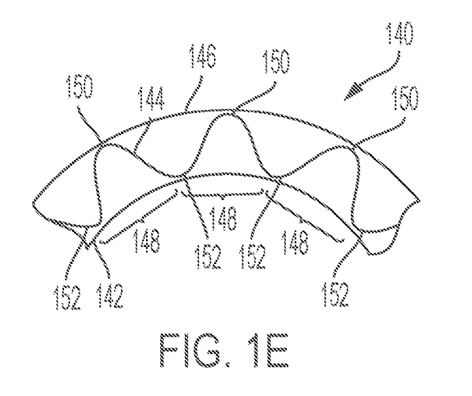
FIG. 1E is a schematic representation of web periodic elements with curved sinusoidal-type shape.

FIG. 1E is a schematic representation of web periodic elements with curved sinusoidal-type shape. FIG. 1E shows drive shaft 140, shaft body 142, corrugated web 144, outer shell 146, periodic elements 148, peaks 150, and troughs 152. Corrugated web 144 is made up of periodic elements 148 which are curved sinusoidal-type in shape. The width in the hoop direction of the periodic elements 148 is measured from one trough 152 to adjacent trough 152.

Figure 2A:
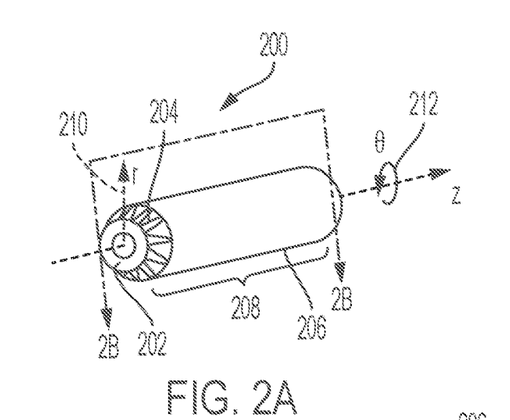
FIG. 2A is a perspective view of an embodiment of a drive shaft.
Figure 2B:
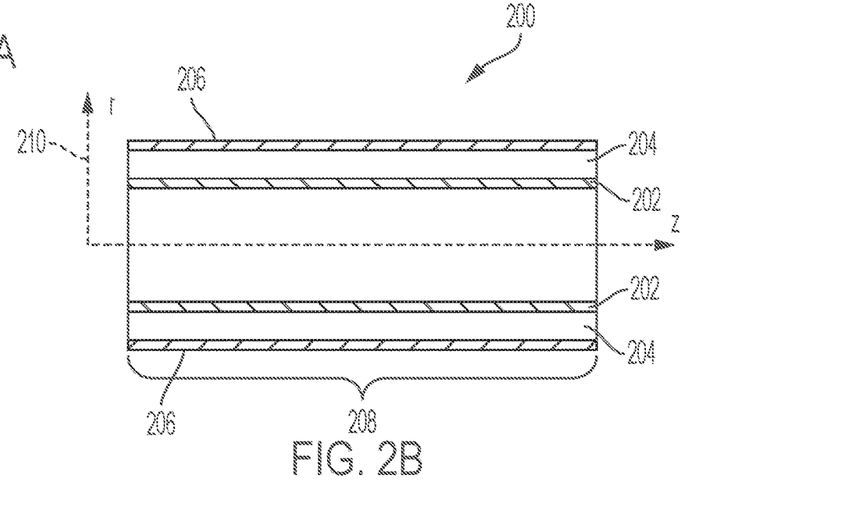
FIG. 2B is an axial cross-sectional view of the embodiment of FIG. 2A taken along line 2B.

FIG. 2A is a perspective view of an embodiment of drive shaft 200. FIG. 2A shows drive shaft 200, which includes shaft body 202, corrugated web 204, and outer shell 206, and length 208, radial direction 210, and hoop direction 212. Length 208 extends along the z-axis. Radial direction 210 is perpendicular to the z-axis and extends along the radii of shaft body 202 and outer shell 206. Hoop direction 212 is the rotational direction around the z-axis. FIG. 2B is an axial cross-sectional view of drive shaft 200 of FIG. 2A taken along line 2B. In FIG. 2B, corrugated web 204 and outer shell 206 extend the full length 208 of shaft body 202.

Figure 3A:
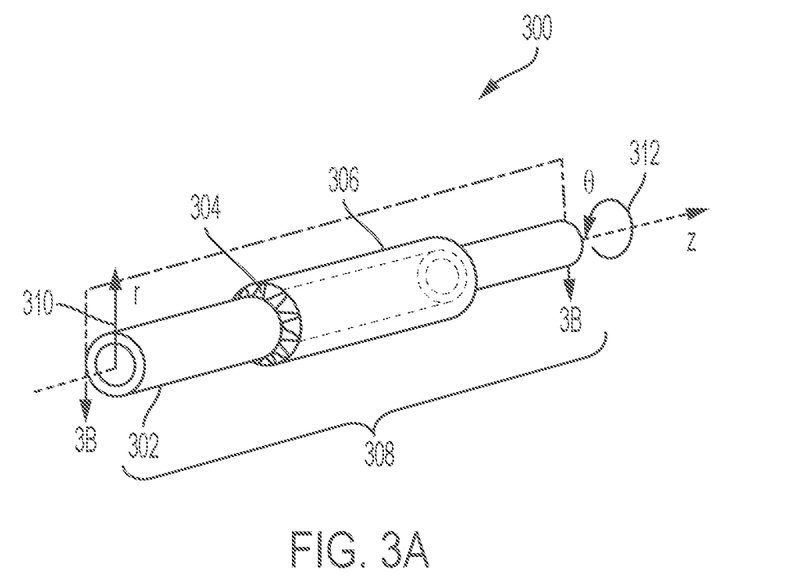
FIG. 3A is a perspective view of an embodiment of a drive shaft.
Figure 3B:
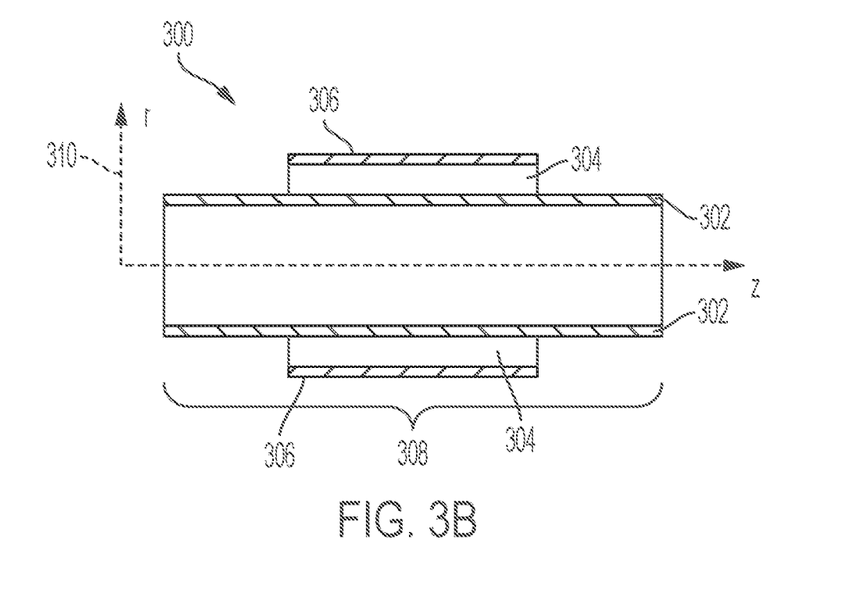
FIG. 3B is an axial cross-sectional view of the embodiment of FIG. 3A taken along line 3B.

FIG. 3A is a perspective view of an embodiment of drive shaft 300. FIG. 3A shows drive shaft 300, which includes shaft body 302, corrugated web 304, outer shell 306, length 308, radial direction 310, and hoop direction 312. Length 308 extends along the z-axis. Radial direction 310 is perpendicular to the z-axis and extends along the radii of shaft body 302 and outer shell 306. Hoop direction 312 is the rotational direction around the z-axis. FIG. 3B is an axial cross-sectional view of drive shaft 300 of FIG. 3A taken along line 3B. In FIG. 3B, corrugated web 304 and outer shell 306 extend along length 308 of shaft body 302 with the ends of drive shaft body 302 exposed. Outer shell 306 and corrugated web 304 can extend, for example, for 90% of length of drive shaft body to avoid more complex joint implementations at ends of the shaft. In other embodiments, outer shell 306 and corrugated web 304 can extend for other lengths of the shaft, for example, for 75%, 50%, or other percentages of the shaft length.

Figure 4A:
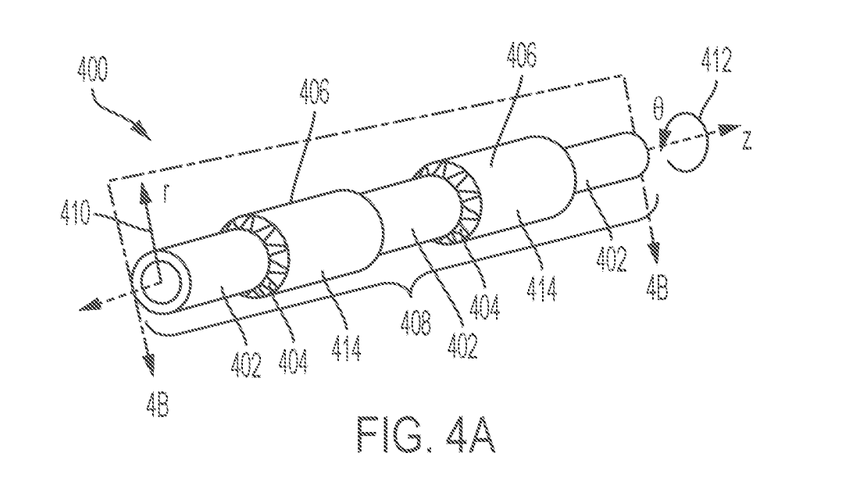
FIG. 4A is a perspective view of an embodiment of a drive shaft.
Figure 4B:
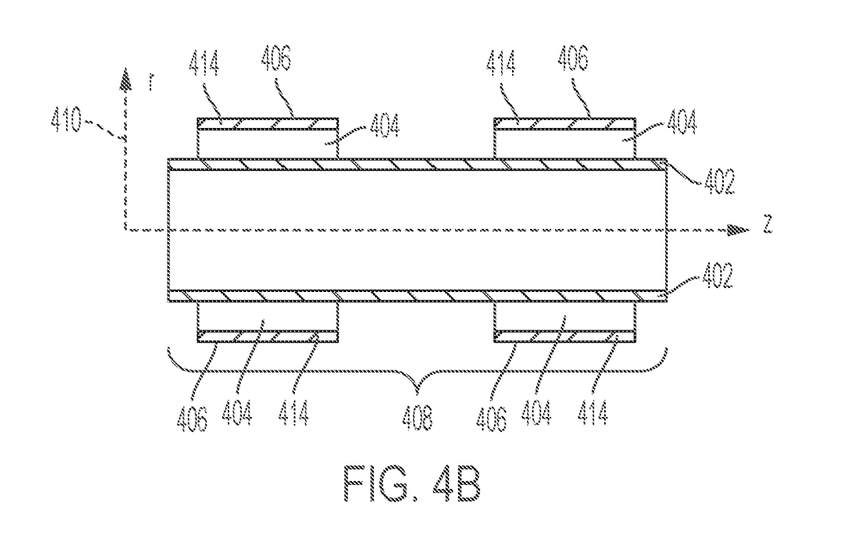
FIG. 4B is an axial cross-sectional view of the embodiment of FIG. 4A taken along line 4B.

FIG. 4A is a perspective view of an embodiment of drive shaft 400. FIG. 4A shows drive shaft 400, which includes shaft body 402, corrugated web 404, and outer shell 406, length 408, radial direction 410, hoop direction 412, and reinforcement segments 414, consisting of both corrugated web 404 and outer shell 406. Length 408 extends along the z-axis. Radial direction 410 is perpendicular to the z-axis and extends along the radii of shaft body 402 and outer shell 406. Hoop direction 412 is the rotational direction around the z-axis. FIG. 4B is an axial cross-sectional view of drive shaft 400 of FIG. 4A taken along line 4B. In FIG. 4B, corrugated web 404 and outer shell 406 extend along length 408 of shaft body 402. Outer shell 406 and corrugated web 404 are divided into two or more reinforcement segments 414, for example 2, 3, or 5 segments. Each reinforcement segment 414 can be the same length or can be a different length. Each individual reinforcement segment 414 can extend, for example, for 45% of the shaft length. In other embodiments, length of segment 414 can be, for example, 40%, 30%, etc. Combined, reinforcement segments 414 can extend for up to 95% of the total length of the drive shaft body. The spaces between reinforcement segments 414 can be of either uniform or non-uniform lengths.

Figure 5A:
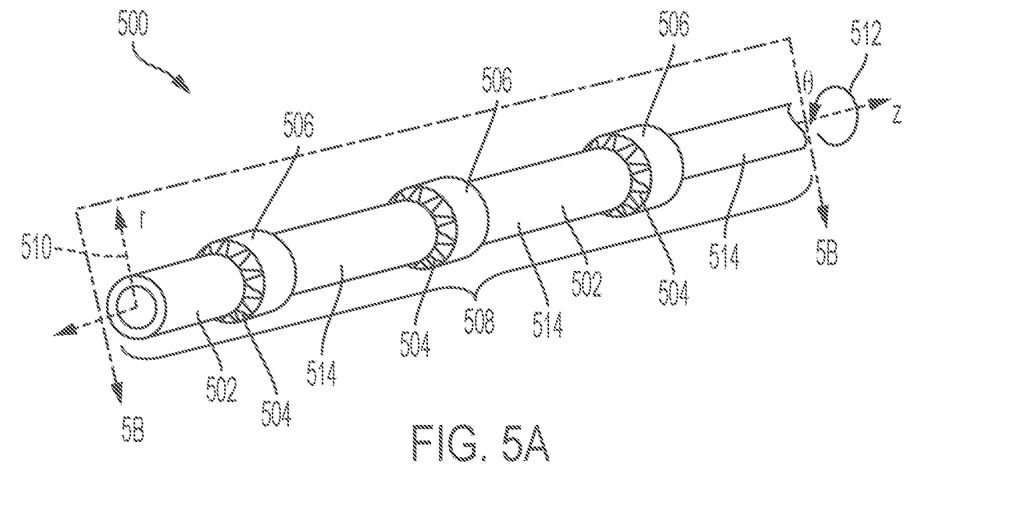
FIG. 5A is a perspective view of an embodiment of a drive shaft.
Figure 5B:
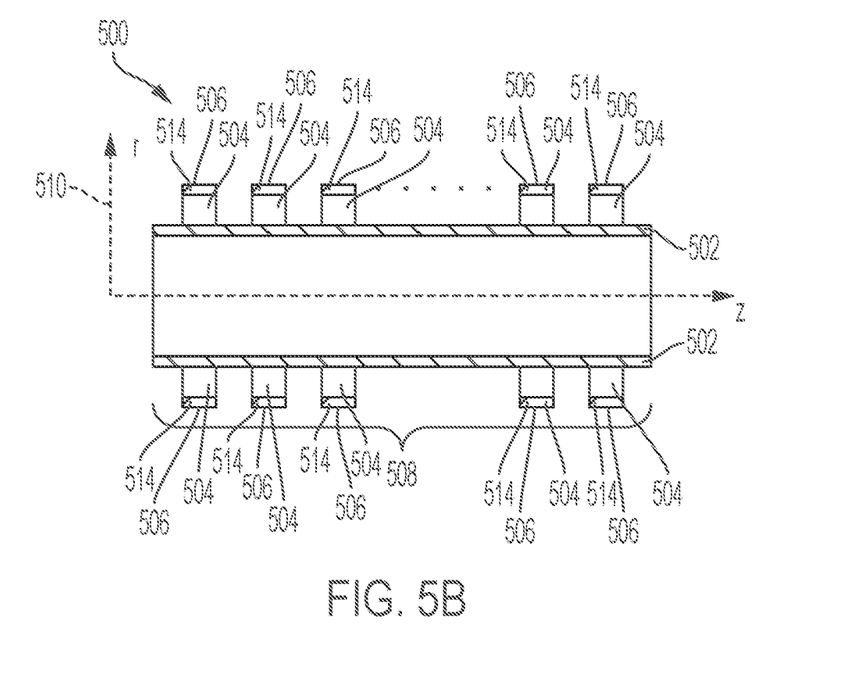
FIG. 5B is an axial cross-sectional view of the embodiment of FIG. 5A taken along line 5B.

FIG. 5A is a perspective view of an embodiment of drive shaft 500. FIG. 5A shows drive shaft 500, which includes shaft body 502, corrugated web 504, and outer shell 506, length 508, radial direction 510, and hoop direction 512, and reinforcement segments 514. Length 508 extends along the z-axis. Radial direction 510 is perpendicular to the z-axis and extends along the radii of shaft body 502 and outer shell 506. Hoop direction 512 is the rotational direction around the z-axis. FIG. 5B is an axial cross-sectional view of drive shaft 500 of FIG. 5A taken along line 5B. In FIG. 5B, corrugated web 504 and outer shell 506 extend along length 508 of shaft body 502. Outer shell 506 and corrugated web 504 are divided into multiple reinforcement segments 514, for example 5, 6, 7, or more segments. Each reinforcement segment 514 can be the same length or can be a different length. In contrast with embodiments shown in FIG. 4, segments 514 are more narrow in the axial direction z. Each individual reinforcement segment 514 can extend, for example, for 10% of shaft body. In other embodiments, their length can be longer (for example, 15% of shaft body) or shorter (for example 8% of shaft body). The spaces between reinforcement segments 514 can be of either uniform or non-uniform lengths.

Figures 6A, 6B:
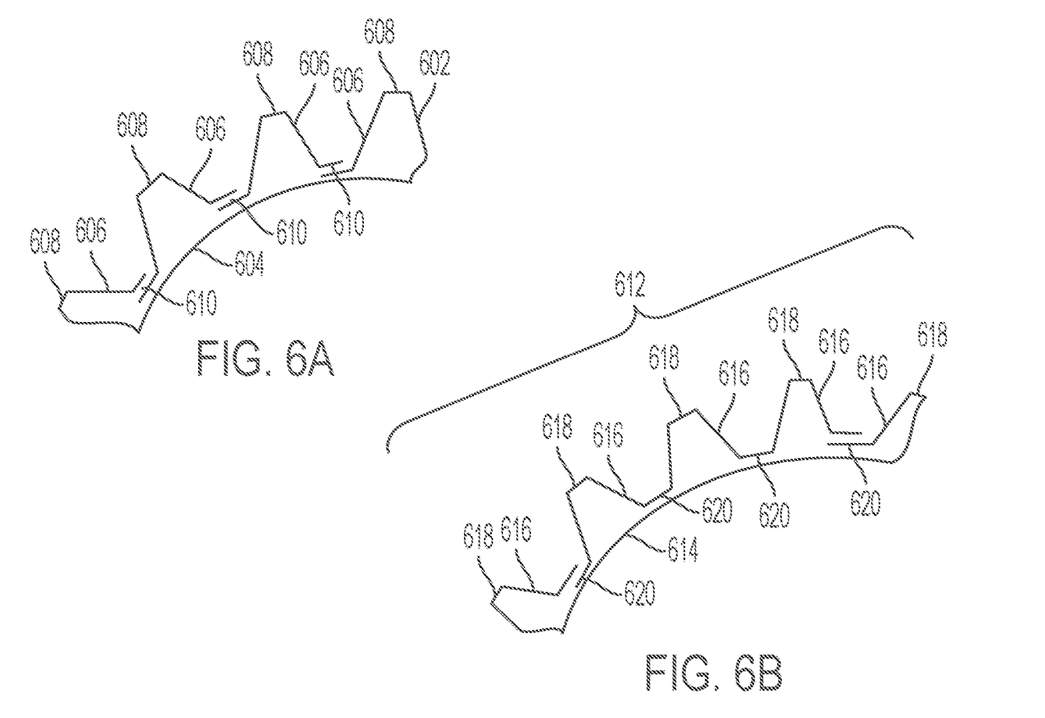
FIGS. 6A-6C are diametric cross-sectional views of embodiments of a web described herein.
Figure 6C:
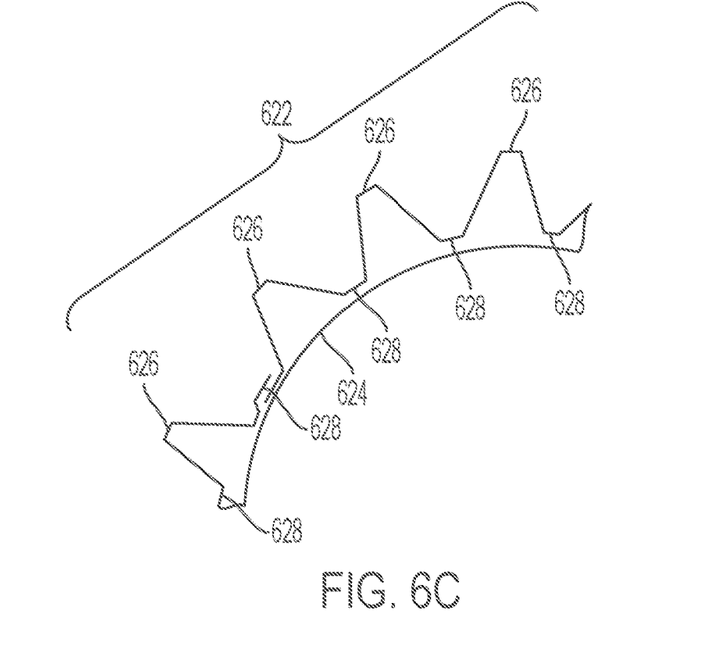

FIGS. 6A-6C are diametric cross-sectional views of embodiments of a web described herein. They are shown on example of trapezoidal web shapes, and similar implementations can be used for curved sinusoidal-type or triangular shapes of web. FIG. 6A shows corrugated web 602 and shaft body 604, as well as web segments 606, web peaks 608, and web troughs 610. Corrugated web 602 is made up of individual web segments 606. Each web segment 606 includes single web peak 608 and two web troughs 610. Web troughs 610 are overlapped to create corrugated web 602 which is attached to the circumference of shaft body 604.

FIG. 6B shows corrugated web 612 and shaft body 614, as well as web segments 616, web peaks 618, and web troughs 620. Corrugated web 612 is made up of web segments 616. Each web segment 616 includes a plurality of web peaks 618 and web troughs 620. Each web segment 616 can have the same or a different number of web peaks 618. Web segments 616 can include, for example, 3, 4, 5, or more web peaks 618. Web troughs 620 are overlapped at each end of web segment 616 to create corrugated web 612 which is attached to the circumference of shaft body 614.

FIG. 6C shows corrugated web 622 and shaft body 624, as well as web peaks 626, and web troughs 628. Corrugated web 622 is a single piece made up of a plurality of web peaks 626 and web troughs 628, covering the entire circumferential length of shaft body. Web troughs 628 are overlapped only at one location, i.e., at the ends of corrugated web 622, which is attached to the circumference of shaft body 614.

Figure 7A:
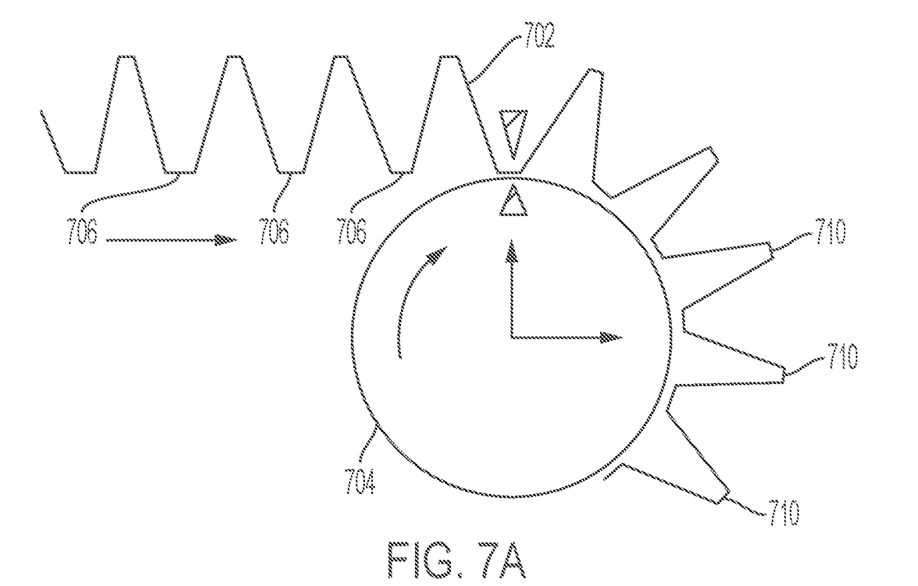
FIG. 7A is a diagram showing a representative method of attaching a web to a tube.

FIG. 7A shows a representative method of attaching already corrugated web 702 to shaft body 704. Shaft body 704 is rotated and web 706 is also moved with a synchronized speed. When web troughs 706 are contacted with shaft body 704, they are affixed to shaft body 704 as corrugated web 702 is pulled along the circumference of shaft body 704. Specific methods to fix web troughs 706 to shaft body 704 depend on applied materials and are described in detail in definitions of FIGS. 8-10.

Figure 7B:
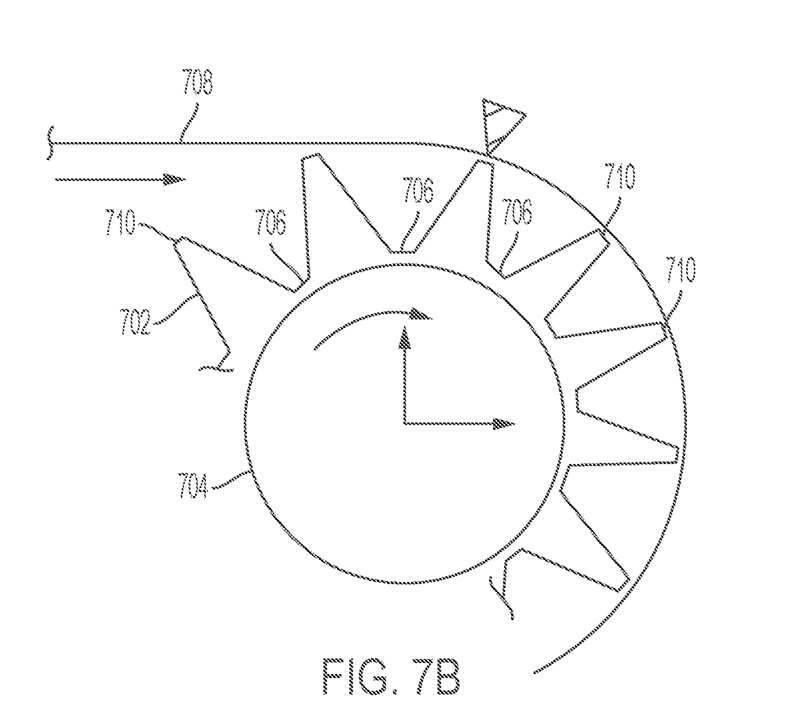
FIG. 7B is a diagram showing a representative method of attaching an outer shell to a web.

FIG. 7B shows a representative method of attaching outer shell 708 to corrugated web 702, when the web is already affixed to shaft body. Shaft body 704 with affixed web is rotated and outer shell 708 is also moved with a synchronized speed. Upon contacts of outer shell 708 with web peaks 710, they are mutually affixed as outer shell 708 is pulled along the circumference of corrugated web 702. Specific methods to fix outer shell 708 and peaks of web 710 depend on applied materials and are described in detail in definitions of FIGS. 8-10. FIGS. 7A and 7B are shown as diametric cross-sections.

Figure 8:
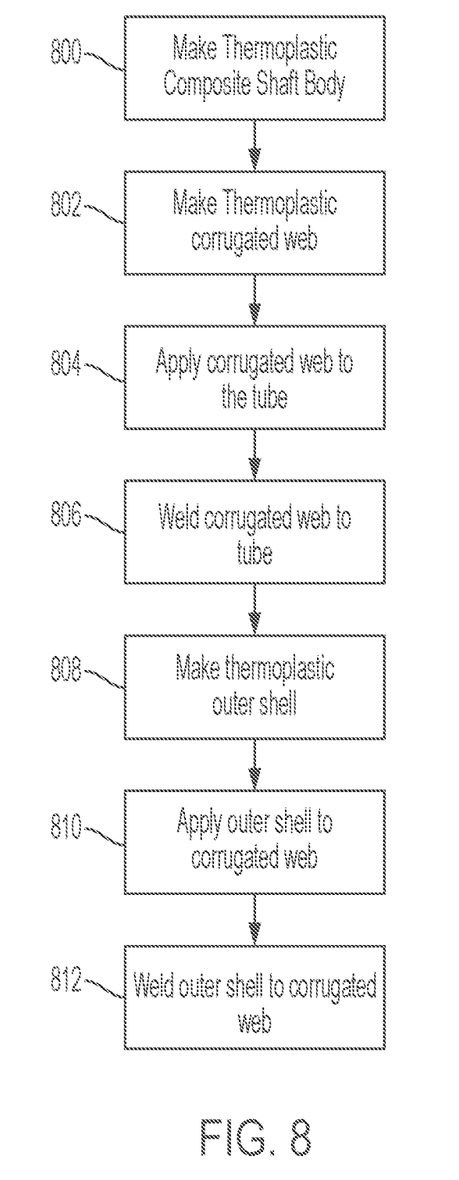
FIG. 8 is a flow diagram for making a thermoplastic composite drive shaft as described herein.

FIG. 8 is a flow diagram illustrating a method for making a thermoplastic composite drive shaft. A reinforced drive shaft described herein is formed from a thermoplastic material by: making the thermoplastic composite shaft body 800, making the thermoplastic corrugated web 802, applying the corrugated web to the tube 804, welding the corrugated web to the shaft body 806, making the outer shell 808, applying the outer shell to the corrugated web 810, and welding the outer shell to the corrugated web 812. Making the thermoplastic composite shaft body 800 can be done be any known method including, for example, by molding or extrusion. Making the thermoplastic corrugated web 802 can be similarly done by any known method including, for example, by molding or extrusion. In some embodiments, the corrugated web can be made as a continuous web that is long enough to cover the circumference of the composite shaft body. In other embodiments, the corrugated web can be made as a number of thermoplastic sections, each of which has a curved base. The sections, when overlapped as described above, are long enough to cover the circumference of the composite shaft body. The corrugated web can be affixed to the shaft body by welding. Applying the corrugated web to the shaft body 804 can be done by placing the corrugated web while the shaft body is held in place or by rotating the shaft body as described above. The corrugated web can also be affixed to the shaft body prior to welding by an adhesive. Welding the corrugated web to the shaft body 806 can be done by any known method, for example heat welding, pressure welding, or any combination thereof. Making the outer shell 808 can be done by any known method including, for example, by molding or extrusion. In some embodiments the outer shell can be made as a continuous shell with a flat base that is long enough to cover the circumference of the corrugated web. In other embodiments the outer shell can be made as a number of thermoplastic sections, each of which has a curved base. The sections, when in place, are long enough to cover the circumference of the composite shaft body. The sections may or may not be overlapped. The outer shell can be affixed to the corrugated web by welding. Applying the outer shell to the corrugated web 810 can be done by placing the outer shell while the shaft body is held in place or by rotating the shaft body as described above. The outer shell can also be affixed to the corrugated web prior to welding by an adhesive. Welding the outer shell to the corrugated web 812 can be done by any known method, for example heat welding, pressure welding, or any combination thereof.

Figure 9:
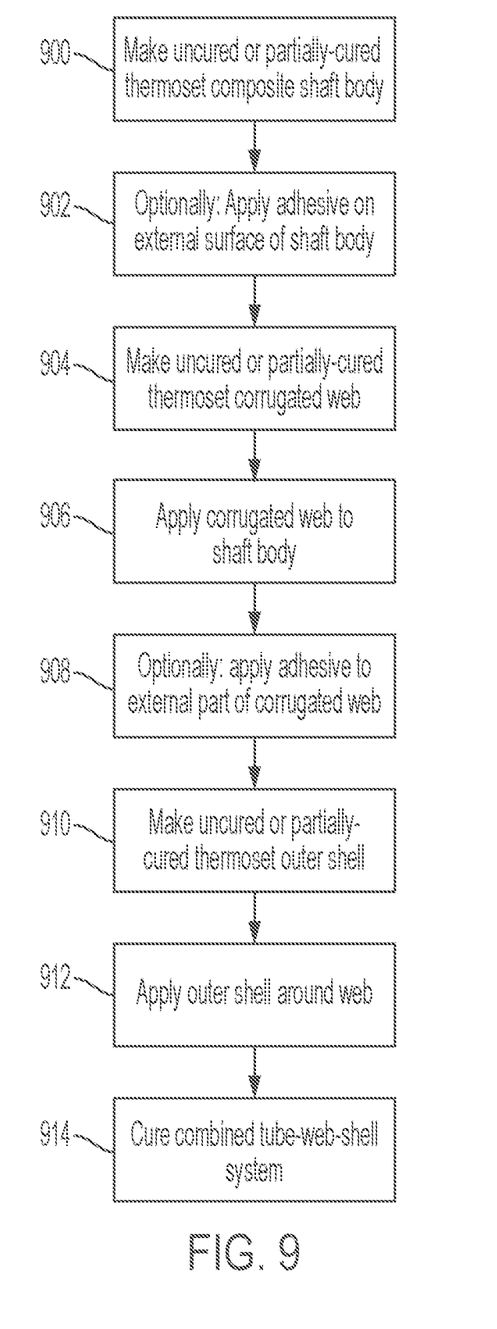
FIG. 9 is a flow diagram for making a thermoset composite drive shaft as described herein.

FIG. 9 is a flow diagram illustrating a method for making a thermoset composite drive shaft. When forming a reinforced drive shaft described herein from a thermoset material, the following steps can be used: making the uncured or partially-cured thermoset composite shaft body 900, optionally applying adhesive on the external surface of the shaft body 902, making the uncured or partially-cured thermoset corrugated web 904, applying the corrugated web to the tube 906, optionally applying adhesive to the external part of the corrugated web 908, making the thermoset uncured or partially-cured outer shell 910, applying the outer shell to the corrugated web 912, and curing the combined tube-web-shell system 914. Making the thermoset composite shaft body 900 can be done be any known method including, for example, by filament-wounding, wrapping, braiding or automated fiber placement (AFP) or any combination thereof. Optional applying adhesive to the external surface of the shaft body 902, can also be done by any known method. Making the thermoset corrugated web 904 can be done by any known method. In some embodiments, the corrugated web can be made as a partially-cured continuous web with a flat base that is long enough to cover the circumference of the composite shaft body. Partially-cured thermosets are thermosets which have been cured enough to allow for certain stiffness sufficient to keep desired shape before and during the curing process, but not so much that they are no longer pliable. Applying the corrugated web to the shaft body 906 can be done by placing the corrugated web while the shaft body is held in place or by rotating the shaft body as described above. Optionally, adhesive can be applied to the external surface of the corrugated web 908. Applying adhesive to the external surface of the corrugated web 908, can be done by any known method. Making the partially-cured outer shell 910 can be done by any known method including, for example, filament-wounding, wrapping, AFP or any combination thereof. The outer shell can be made as a continuous shell with a flat base that is long enough to cover the circumference of the corrugated web. Applying the outer shell to the corrugated web 912 can be done by placing the outer shell while the shaft body is held in place or by rotating the shaft body as described above. Curing combined tube-web-shell system 914 is then completed.

Figure 10:
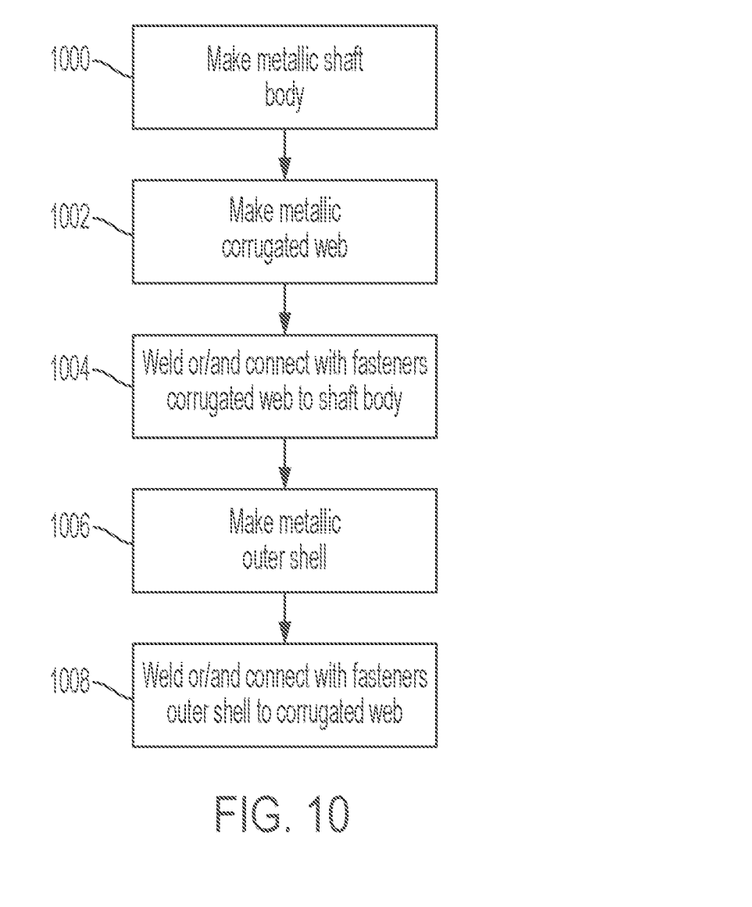
FIG. 10 is a flow diagram for making a metallic drive shaft as described herein.

FIG. 10 is a flow diagram illustrating a method for making a metallic drive shaft. When forming a reinforced drive shaft described herein from a metallic material, the following steps can be used: making the metallic shaft body 1000, making the metallic corrugated web 1002, affixing the corrugated web to the shaft body 1004, making the outer shell 1006, and affixing the outer shell to the corrugated web 1008. Making the metallic shaft body 1000 can be done be any known method typically applied for making metallic tubes. Making the metallic corrugated web 1002 can be done by any known method, for example, by hot or cold forming. In some embodiments, the corrugated web can be made as a continuous web with a flat base that is long enough to cover the circumference of the composite shaft body. In other embodiments, the corrugated web can be made as a number of metallic sections, each of which has a curved base. The sections, when overlapped as described above, are long enough to cover the circumference of the composite shaft body. Affixing the corrugated web to the shaft body 1004 can be done by any known method, for example heat welding, pressure welding, or fasteners, such as, for example, rivets, bolts or any combination thereof. Making the outer shell 1006 can also be done by any known method. The outer shell can be made as a continuous shell with a flat base that is long enough to cover the circumference of the corrugated web. Alternatively, the outer shell can also be made as a number of metallic sections, each of which has a curved base. The sections, when in place, are long enough to cover the circumference of the composite shaft body. The sections may or may not be overlapped. Affixing the outer shell to the corrugated web 1008 can be done by any known method, for example heat welding, pressure welding, or different fasteners, i.e., rivets and bolts or any combination thereof.

Discussion of Possible Embodiments

The following are non-exclusive descriptions of possible embodiments of the present invention.

A mechanical part configured to be placed under torque, the mechanical part comprising: an inner tube having an outer tube circumference, a tube axial direction, and a tube length; a corrugated web having a plurality of peaks and a plurality of troughs, a height measured as a difference between one of the peaks and one of the troughs, and a web length perpendicular to the height and in the tube axial direction; and an outer shell having an inner shell circumference, an outer shell circumference, and a shell length; wherein the plurality of troughs are affixed to the outer circumference of the inner tube and the plurality of peaks are affixed to the inner shell circumference of the outer shell, and the web length is aligned with the tube length and the shell length.

The mechanical part of the preceding paragraph can optionally include, additionally and/or alternatively, any one or more of the following features, configurations and/or additional components:

A further embodiment of the foregoing mechanical part, wherein the web length and the shell length are less than the tube length.

A further embodiment of any of the foregoing mechanical parts, further comprising: a second corrugated web having a second plurality of peaks and a second plurality of troughs, a second height measured as a difference between one of the second peaks and one of the second troughs, and a second web length perpendicular to the second height and in the tube axial direction; and a second outer shell having a second inner shell circumference, a second outer shell circumference, and a second shell length; wherein the second plurality of troughs are affixed to the outer circumference of the inner tube and the second plurality of peaks are affixed to the second inner circumference of the second outer shell, and the second web length is aligned with the tube length and the second shell length.

A further embodiment of any of the foregoing mechanical parts, further comprising: a third corrugated web having a third plurality of peaks and a third plurality of troughs, a third height measured as a difference between one of the third peaks and one of the third troughs, and a second web length perpendicular to the third height and in the tube axial direction; and a third outer shell having a third inner shell circumference, a third outer shell circumference, and a third shell length; wherein the third plurality of troughs are affixed to the outer circumference of the inner tube and the second plurality of peaks are affixed to the third inner circumference of the third outer shell, and the third web length is aligned with the tube length and the third shell length.

A further embodiment of any of the foregoing mechanical parts, wherein the corrugated web comprises a plurality of corrugation segments.

A further embodiment of any of the foregoing mechanical parts, wherein the inner tube or the outer tube or the corrugated web comprises a thermoplastic composite material.

A further embodiment of any of the foregoing mechanical parts, wherein the inner tube or the outer tube or the corrugated web comprises a thermoset composite material.

A further embodiment of any of the foregoing mechanical parts, wherein the inner tube or the outer tube or the corrugated web comprises metal or alloy.

A further embodiment of any of the foregoing mechanical parts, wherein the corrugated web comprises a plurality of triangle-shaped elements.

A further embodiment of any of the foregoing mechanical parts, wherein the corrugated web comprises a plurality of trapezoidal-shaped elements.

A further embodiment of any of the foregoing mechanical parts, wherein the corrugated web comprises a plurality of elements with curved sinusoidal-type shapes.

A method of making any of the mechanical parts described above, the method comprising: providing the inner tube, the corrugated web, and the outer shell; affixing the corrugated web to the outer circumference of the inner tube; and affixing the inner circumference of the outer shell to the plurality of the peaks of the corrugated web to form a combined tube-web-shell system.

The method of the preceding paragraph can optionally include, additionally and/or alternatively, any one or more of the following features, configurations and/or additional components:

A further embodiment of the foregoing method, wherein the inner tube, the corrugated web, and the outer shell comprise a thermoplastic composite material, and further comprising the steps of: welding the plurality of troughs of corrugated web to the outer circumference of the inner tube; and welding the inner circumference of the outer shell to the plurality of the peaks of the corrugated web.

A further embodiment of any of the foregoing methods, wherein the inner tube, the corrugated web, and the outer shell comprise a thermoplastic composite material, and further comprising the steps of: applying an adhesive to the outer circumference of the inner tube; applying force to affix the plurality of the troughs of the corrugated web to the outer circumference of the inner tube; applying an adhesive to the plurality of peaks of the corrugated web; and applying force to affix the inner circumference of the outer shell to the plurality of the peaks of the corrugated web.

A further embodiment of any of the foregoing methods, wherein the inner tube, the corrugated web, and the outer shell comprise an un-cured or partially-cured thermoset composite material, and further comprising the steps of: affixing the plurality of troughs of the corrugated web to the outer circumference of the inner tube; affixing the outer shell to the plurality of peaks of the corrugated web; and curing the combined tube-web-shell system.

A further embodiment of any of the foregoing methods, wherein the inner tube, the corrugated web, and the outer shell comprise an un-cured or partially-cured thermoset composite material, and further comprising the steps of: applying an adhesive to the outer circumference of the inner tube; applying force to affix the plurality of troughs of the corrugated web to the adhesive on the outer circumference of the inner tube; applying an adhesive to the plurality of peaks of the corrugated web; applying force to affix the outer shell to the adhesive on the plurality of peaks of the corrugated web; and curing the combined tube-web-shell system.

A further embodiment of any of the foregoing methods, wherein the inner tube, the corrugated web, and the outer shell comprise a metal or alloy, further comprising the steps of: welding the plurality of troughs of corrugated web to the outer circumference of the inner tube; and welding the inner circumference of the outer shell to the plurality of the peaks of the corrugated web.

A further embodiment of any of the foregoing methods, wherein the inner tube, the corrugated web, and the outer shell comprise a metal or alloy, further comprising the steps of: affixing the plurality of troughs of corrugated web to the outer circumference of the inner tube by mechanical fasteners or a combination of mechanical fasteners with welding; and affixing the inner circumference of the outer shell to the plurality of the peaks of the corrugated web by mechanical fasteners, or a combination of mechanical fasteners with welding.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A mechanical part configured to be placed under torque, the mechanical part comprising:
   an inner tube having an outer tube circumference, a tube axial direction, and a tube length;
   a corrugated web having a plurality of peaks and a plurality of troughs, a height measured as a difference between one of the peaks and one of the troughs, and a web length perpendicular to the height and in the tube axial direction; and
   an outer shell having an inner shell circumference, an outer shell circumference, and a shell length;
   wherein the plurality of troughs are affixed to the outer tube circumference of the inner tube and the plurality of peaks are affixed to the inner shell circumference of the outer shell, and the web length is aligned with the tube length and the shell length.

2. The mechanical part of claim 1 wherein the web length and the shell length are less than the tube length.

3. The mechanical part of claim 2, further comprising:
   a second corrugated web having a second plurality of peaks and a second plurality of troughs, a second height measured as a difference between one of the second peaks and one of the second troughs, and a second web length perpendicular to the second height and in the tube axial direction; and
   a second outer shell having a second inner shell circumference, a second outer shell circumference, and a second shell length;
   wherein the second plurality of troughs are affixed to the outer tube circumference of the inner tube and the second plurality of peaks are affixed to the second inner shell circumference of the second outer shell, and the second web length is aligned with the tube length and the second shell length.

4. The mechanical part of claim 3, further comprising:
   a third corrugated web having a third plurality of peaks and a third plurality of troughs, a third height measured as a difference between one of the third peaks and one of the third troughs, and a third web length perpendicular to the third height and in the tube axial direction; and
   a third outer shell having a third inner shell circumference, a third outer shell circumference, and a third shell length;
   wherein the third plurality of troughs are affixed to the outer tube circumference of the inner tube and the third plurality of peaks are affixed to the third inner shell circumference of the third outer shell, and the third web length is aligned with the tube length and the third shell length.

5. The mechanical part of claim 1 wherein the corrugated web comprises a plurality of corrugation segments.

6. The mechanical part of claim 1 wherein the inner tube or the outer shell or the corrugated web comprises a thermoplastic composite material.

7. The mechanical part of claim 1 wherein the inner tube or the outer shell or the corrugated web comprises a thermoset composite material.

8. The mechanical part of claim 1 wherein the inner tube or the outer shell or the corrugated web comprises metal or alloy.

9. The mechanical part of claim 1 wherein the corrugated web comprises a plurality of triangle-shaped elements.

10. The mechanical part of claim 1 wherein the corrugated web comprises a plurality of trapezoidal-shaped elements.

11. The mechanical part of claim 1 wherein the corrugated web comprises a plurality of elements with curved sinusoidal-type shapes.

12. A method of making the mechanical part of claim 1, the method comprising:
    providing the inner tube, the corrugated web, and the outer shell;
    affixing the corrugated web to the outer circumference of the inner tube; and
    affixing the inner shell circumference of the outer shell to the plurality of the peaks of the corrugated web to form a combined tube-web-shell system.

13. The method of claim 12 wherein the inner tube, the corrugated web, and the outer shell comprise a thermoplastic composite material, and further comprising the steps of:
  welding the plurality of troughs of the corrugated web to the outer tube circumference of the inner tube; and
  welding the inner shell circumference of the outer shell to the plurality of the peaks of the corrugated web.

14. The method of claim 12 wherein the inner tube, the corrugated web, and the outer shell comprise a thermoplastic composite material, and further comprising the steps of:
  applying an adhesive to the outer tube circumference of the inner tube;
  applying force to affix the plurality of the troughs of the corrugated web to the outer tube circumference of the inner tube;
  applying the adhesive to the plurality of peaks of the corrugated web; and
  applying force to affix the inner shell circumference of the outer shell to the plurality of the peaks of the corrugated web.

15. The method of claim 12 wherein the inner tube, the corrugated web, and the outer shell comprise an un-cured or partially-cured thermoset composite material, and further comprising the steps of:
  affixing the plurality of troughs of the corrugated web to the outer tube circumference of the inner tube;
  affixing the outer shell to the plurality of peaks of the corrugated web; and
  curing the combined tube-web-shell system.

16. The method of claim 12 wherein the inner tube, the corrugated web, and the outer shell comprise an un-cured or partially-cured thermoset composite material, and further comprising the steps of:
  applying an adhesive to the outer tube circumference of the inner tube;
  applying force to affix the plurality of troughs of the corrugated web to the adhesive on the outer tube circumference of the inner tube;
  applying the adhesive to the plurality of peaks of the corrugated web;
  applying force to affix the outer shell to the adhesive on the plurality of peaks of the corrugated web; and
  curing the combined tube-web-shell system.

17. The method of claim 12 wherein the inner tube, the corrugated web, and the outer shell comprise a metal or alloy, further comprising the steps of:
  welding the plurality of troughs of the corrugated web to the outer tube circumference of the inner tube by welding; and
  welding the inner shell circumference of the outer shell to the plurality of peaks of the corrugated web by welding.

18. The method of claim 12 wherein the inner tube, the corrugated web, and the outer shell comprise a metal or alloy, further comprising the steps of:
  affixing the plurality of troughs of the corrugated web to the outer tube circumference of the inner tube by mechanical fasteners, or a combination of mechanical fasteners with welding; and
  affixing the inner circumference of the outer shell to the plurality of the peaks of the corrugated web by mechanical fasteners, or a combination of mechanical fasteners with welding.

\* \* \* \* \*